United States Patent [19]

Malecha

[11] Patent Number: 5,042,628
[45] Date of Patent: Aug. 27, 1991

[54] RADIAL SPACER AND RETAINER FOR ROLLER ONE-WAY CLUTCH

[75] Inventor: Gregory J. Malecha, Naperville, Ill.

[73] Assignee: Borg-Warner Automotive, Inc., Sterling Heights, Mich.

[21] Appl. No.: 493,081

[22] Filed: Mar. 13, 1990

[51] Int. Cl.[5] .............................................. F16D 41/07
[52] U.S. Cl. .................................. 192/45; 192/41 R
[58] Field of Search ...................... 192/45, 41 A, 41 R

[56] References Cited

U.S. PATENT DOCUMENTS

| 3,083,802 | 4/1963 | Stageberg | 192/45.1 |
|---|---|---|---|
| 3,118,525 | 1/1964 | Fischer | 192/45 |
| 3,547,238 | 12/1970 | Harmon | 192/4.5 |
| 3,760,914 | 9/1973 | Gelbrich | 192/45 |
| 4,178,805 | 12/1979 | Mazzorana | 74/6 |
| 4,236,619 | 12/1980 | Kuroda | 192/45 |
| 4,570,762 | 2/1986 | Husmann | 188/82.84 |

FOREIGN PATENT DOCUMENTS 2348733  4/1975  Fed. Rep. of Germany .

Primary Examiner—Allan D. Herrmann
Assistant Examiner—Andrea Pitts
Attorney, Agent, or Firm—Reising, Ethington et al.

[57] ABSTRACT

A roller one-way clutch assembly has a single integral spacer element formed as a ring having an I.D. surface which is supported on a shoulder of the inner race of the clutch assembly and having an O.D. surface supported on a shoulder of the outer race to radially space the inner race and the outer race for precision accommodation of a caged roller one-way clutch in an operating space therebetween and wherein the outer race further includes an annular groove for receiving retention tabs on the ring to fix it axially on the outer race so as to provide retention of the roller clutch in the operating space between the inner and outer races.

2 Claims, 2 Drawing Sheets

RADIAL SPACER AND RETAINER FOR ROLLER ONE-WAY CLUTCH

FIELD OF THE INVENTION

This invention relates to roller one-way clutches and more particularly to such clutches having a caged roller one-way clutch located in an operating space between inner and outer race members.

BACKGROUND OF THE INVENTION

Various proposals have been suggested to improve the operating efficiencies of a roller one-way clutch mechanism including providing spacers for maintaining spacing between the inner and outer races. Prior proposals have not provided for retention of roller elements between inner and outer races by use of a single integral ring element that serves the dual function of radial spacing of the inner and outer race components and retention of roller elements in the operating space between the inner and outer race components. As a consequence rollers can escape from the assembly. A problem may arise if rollers are reinserted under field conditions in a manner in which they are misaligned or are not properly cleaned prior to reassembly.

U.S. Pat. No. 3,083,802 discloses the use of a centered roller bearing for providing radial spacing between inner and outer races of a clutch mechanism. It does not provide for a single integral element for providing both radial spacing and for retention of a caged roller one-way clutch mechanism in the operating space between inner and outer races so as to prevent the roller elements from escaping during shipping.

U.S. Pat. No. 3,118,525 discloses such a clutch with spacers for axially positioning two separate caged roller mechanisms between a central shaft and two outer races.

U.S. Pat. No. 3,547,238 discloses a roller one-way clutch with individual spaced side plates that connect on individual spring retainers. Separate flange pieces are required to complete the assembly after the inner and outer races are assembled on the operating shaft. The assembly does not address the problem of radial spacing and roller retention during shipping or handling.

U.S. Pat. No. 4,178,805 discloses a roller one-way clutch formed as part of an engine starter assembly. The rollers are held in place by a cover having an end wall but the cover does not provide radial spacing nor does it provide for retention of rollers in a one-way clutch cage located in the operating space between preassembled inner and outer race components. U.S. Pat. No. 4,438,836 discloses a roller one-way clutch like the '805 clutch but assembled in a free wheel hub assembly rather than in an engine starter assembly. It has the same deficiencies as the '805 patent.

U.S. Pat. No. 4,236,619 discloses a roller clutch with bearing rings on either end thereof which support radial loads and take the place of separate bearing rings external of the roller clutch mechanism. The bearing rings are supported on an associated shaft and as preassembled have a clearance for assembly on the shaft. They do not serve the function of radially spacing inner and outer race components of a roller clutch assembly as well as the function of retaining the roller components within a roller assembly during shipping. In the '619 disclosure the roller components can slip from their seats and escape through the opening in the end bearings.

U.S. Pat. No. 4,570,762 discloses a roller one-way clutch having an inner and outer race with a caged roller and spring array supported in the operating space therebetween. The caged roller one-way clutch has spaced side walls joined by transverse webs. The side walls must be joined following insertion of the roller components and they do not serve to provide for circumferential radial spacing of the inner and outer race components of the assembly. German Patent No. 23 48 733 discloses a similar roller one-way clutch with similar deficiencies.

SUMMARY OF THE INVENTION

An object of the present invention is to provide a roller one-way clutch having preassembled inner and outer race components with an operating space therebetween occupied by a caged roller one-way clutch and wherein a single integral spacer ring is provided to radially space the inner and outer race to define a precision operating space for the caged roller one-way clutch and wherein the single integral spacer ring also serves to retain the rollers of the caged roller one-way clutch in place following assembly and during shipment.

A feature of the present invention is to provide such a roller one-way clutch having a single integral spacer element with surface means for locking the spacer element to one of the races against axial separation with respect thereto so as to prevent the escape of preassembled rollers from open pockets in the caged roller one-way clutch.

A further feature of the present invention is to provide such a roller one-way clutch having a cage with open side pockets for initial assembly of the roller components and wherein the single integral spacer element is arranged to close the pockets and interlock to one of the races to prevent axial separation therebetween so as to maintain the rollers in place during shipment of the preassembled inner and outer races with the caged roller one-way clutch therebetween.

A further feature of the present invention is to provide a spacer ring adjacent to one or both ends of a caged roller one-way clutch wherein the spacer ring is accurately sized to provide radial alignment of preassembled inner and outer races and to prevent escape of roller components from the operating space between the inner and outer races during assembly and during shipment of the assembled unit.

Yet another feature of the aforesaid roller one-way clutch assemblies is to configure the single integral spacer ring to direct, contain and enhance lubrication flow within the clutch operating space.

A still further feature of the present invention is to provide for such lubrication flow by shaping the ring to have inboard radii at axially extending end segments thereon which respectively contact the inner and outer races for maintaining an exact radial spacing therebetween. The ring has a height and thickness which supports radial loads on the races and which provides desired radial dimension and axial spacer width requirements in the operating space for the caged roller one-way clutch.

These and other objects, features and advantages of the present invention will become more apparent when considered in conjunction with the following description and drawings wherein:

DETAILED DESCRIPTION OF PREFERRED EMBODIMENT OF THE INVENTION

Figure 1:
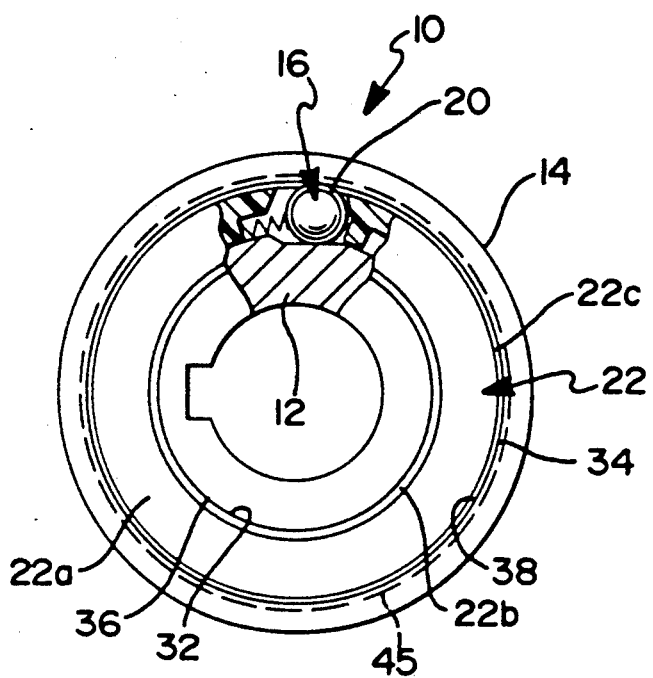
FIG. 1 is a front elevational view of an assembled roller one-way clutch including the present invention.
Figure 5:
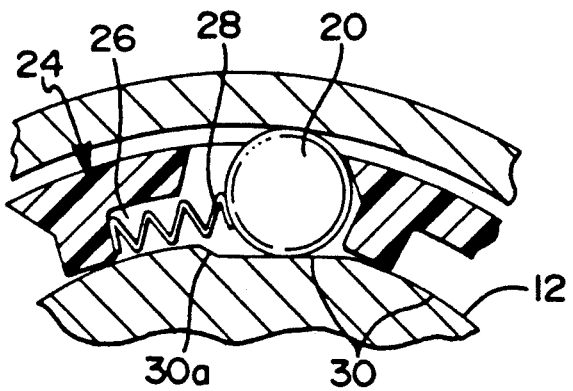
FIG. 5 is a enlarged fragmentary sectional view showing a roller receiving pocket and spring in the roller one-way clutch of FIG. 1.
Figure 3:
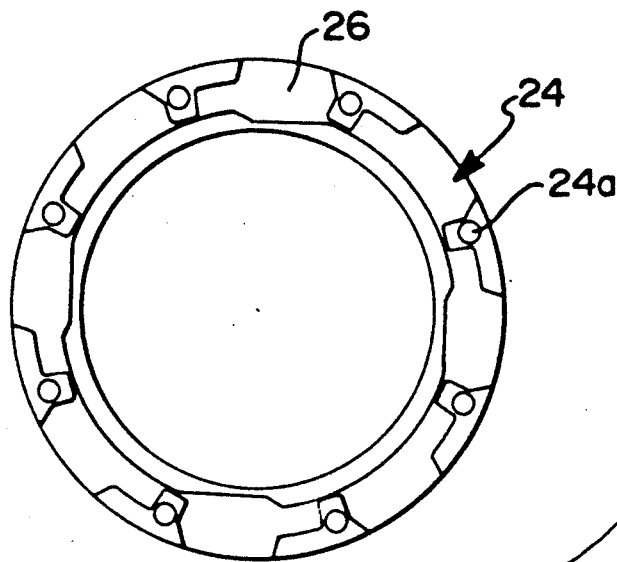
FIG. 3 is a front elevational view of a cage component in the assembly of FIG. 1.

Referring now to FIGS. 1 and 5, a roller one-way clutch 10 is illustrated including an inner race 12 and an outer race 14 with a caged roller one-way clutch 16 located therebetween. The inner race 12, outer race 14 and clutch 16 are preassembled as a unit and shipped together for assembly in a larger machine or apparatus.

In accordance with one aspect of the present invention it is desirable to provide an operating space 18 between the inner race 12 and the outer race 14 which is precisely radially dimensioned for smooth operation of roller components 20 in the caged roller one-way clutch 16. To accomplish this objective a one piece radial spacer ring 22 is provided to maintaining the desired radial spacing of the inner and outer races 12, 14 and to retain the individual rollers 20 in place following preassembling and during shipment of the assembled unit for use in a larger machine or apparatus. As will be described in detail below, the one piece radial spacer ring 22 has a configuration especially suited to maintaining desired radial spacing between the inner and outer races 12, 14. The spacer ring 22 also includes integral means thereon for retaining the clutch components axially within the operating space 18. The spacer ring 22 also includes integral means thereon for controlling lubrication flow with the operating space 18 during operation of the roller one-way clutch 10.

More specifically, the roller one-way clutch 10, in addition to the rollers 20 includes a cage 24 having pockets 26 in which the rollers 20 and pleated leaf springs 28 are located for suspending the rollers 20 as they grip and release depending upon the direction of relative rotation between the inner and outer races 12, 14. The leaf springs 28 are exemplary, with it being understood that other spring types and other orientations of the leaf springs 28 are contemplated within the scope of the invention.

The inner race 12 includes counter gripping surfaces 30 with shoulders 30a which allow the inner race to free wheel when the inner race 12 is rotated in a clockwise direction as viewed in FIG. 5. The surfaces 30 will grip the rollers to prevent relative rotation of the races 12, 14 in the opposite direction of rotation of the inner race 12. While the counter gripping surfaces are shown on the inner race 12 it should be understood that the spacer ring 22 of the present invention is equally suited for use with roller one-way clutches where such gripping surfaces are formed on the outer race.

Figure 6:
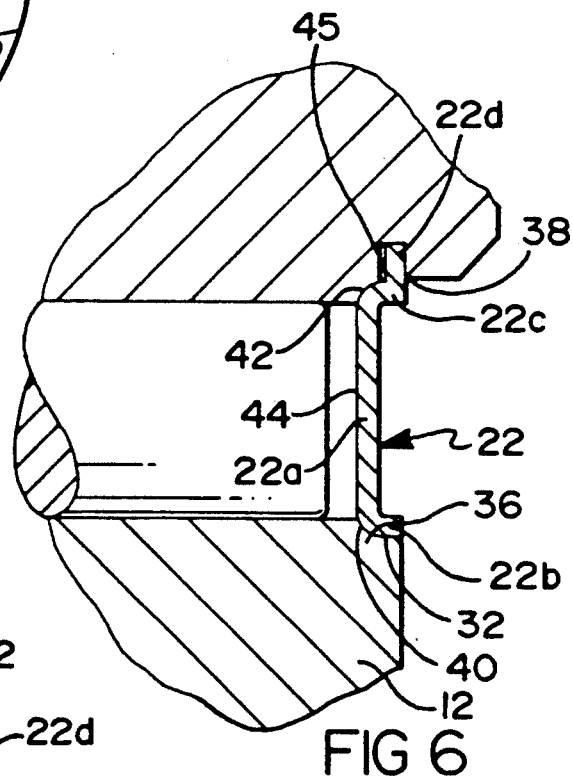
FIG. 6 is an enlarged fragmentary sectional view of the spacer ring component showing oil flow and bearing support surface segments thereon.
Figure 4:
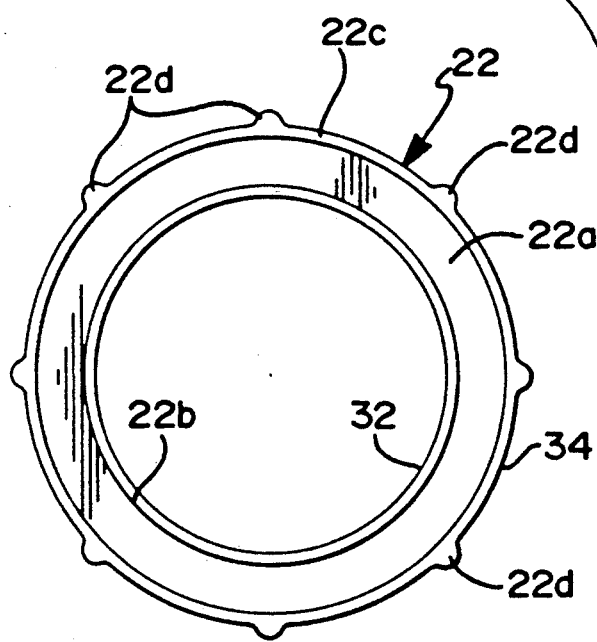
FIG. 4 is a front elevational view of a spacer ring component in the assembly of FIG. 1.

The cage 24 is also illustrative of a cage suitable for receiving the rollers 20. The cage 24 has circumferentially spaced cross arms 24a serving to define the side walls of the pockets 26. In the illustrated arrangement the cage 24 also has a closure wall 24b which prevents the assembled rollers 20 from escaping the cage 24 through one end of the pockets 26. In accordance with the present invention the spacer ring 22 is shaped to have a central annular segment 22a that closes the opposite end of the pockets 26 as best seen in FIG. 6. The spacer ring 22 also has a pair of axially outwardly bent ends 22b and 22c that define annular bearing surfaces 32, 34 respectively. The bearing surface 32 engages the inner race 12 at an axial annular reference surface 36 at the O.D. of the inner race 12 as best seen in FIG. 6. The bearing surface 34 engages a annular reference surface 38 on the outboard face and I.D. of the outer race 14. The bearing surfaces 32, 34 have a length and the spacer ring 22 has a width which is selected to provide for radial loadings on the inner and outer races 12, 14 to assure that the spacer ring 22 will maintain a desired radial relationship between the I.D. of the outer race 14 and the O.D. of the inner race. Such spacing, in certain bearing designs will allow higher overrunning speeds, will accommodate higher radial loads and in certain cases can eliminate the need for separate bearing block inserts to provide radial alignment.

Another aspect of the present invention is that the spacer ring 22 is configured to have radius surfaces 40, 42 on the inboard surface 44 thereof. The surfaces 40, 42 provide for flow of lubricant across the surfaces 32, 34, 36 and 38 to enhance lubrication of the clutch, races and adjacent components in which the roller one-way clutch 10 is later assembled.

While only one spacer ring 22 is illustrated it should be understood that a like spacer ring can be provided on the opposite end of the assembled inner and outer race in cases where greater radial load bearing capacity is desired.

Figure 2:
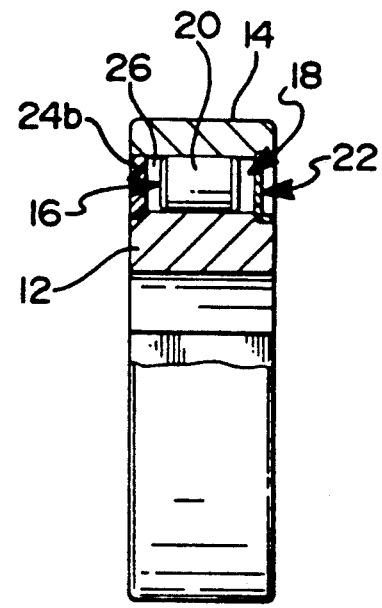
FIG. 2 is a side elevational view, partially sectioned of the roller one-way clutch of FIG. 1.

In either case, another aspect of the invention is the provision of circumferentially spaced radially projecting tabs 22d are provided on each ring 22. The tabs 22d are received in an annular groove 45 formed in the outer race 14 as seen in FIG. 2.

The invention has been shown and described with reference to specific embodiments, however, it should be noted that the invention is in no way limited to the details of the illustrated structures but changes and modifications may be made without departing from the scope of the appended claims.

What is claimed is:

1. A roller clutch assembly having an outer race and an inner race and a cage located therebetween with roller components and spring components moveable with respect to the inner and outer races and interacting with mating surfaces on the inner and outer races to lock relative rotation between the inner and outer races in one direction of relative rotation therebetween and to cause one of the races to overrun the other of the races in an opposite direction of relative rotation therebetween characterized by:

the cage having means thereon for forming closed pockets with an open end for loading the roller components therein and for locating the rollers between the inner race and the outer race;

and an integral spacer and roller component retainer element interlockingly connected to one of the inner and outer races for maintaining a controlled radial spacing therebetween independent of radial contact between said roller components and said inner and outer races for smoothing operation of the roller components during the first and second directions of relative rotation;

said integral spacer and roller component retainer element also having surface means thereon for closing said pockets for preventing escape of the rollers from said pockets; and coating means including a groove formed on the inside diameter of one of said races and tab means on said integral spacer and roller component retainer element for axially locking said integral spacer and roller component retainer element with respect to said inner and outer races.

2. A roller clutch assembly having an outer race and an inner race and a cage located therebetween with roller components and spring components moveable with respect to the inner and outer races and interacting with mating surfaces on the inner and outer races to lock relative rotation between the inner and outer races in one direction of relative rotation therebetween and to cause one of the races to overrun the other of the races in an opposite direction of relative rotation therebetween characterized by:

the cage having means thereon for forming closed pockets with an open end for loading the roller components therein and for locating the rollers between the inner race and the outer race;

and an integral spacer and roller component retainer element interlockingly connected to one of the inner and outer races for maintaining a controlled radial spacing therebetween independent of radial contact between said roller components and said inner and outer races for smoothing operation of the roller components during the first and second directions of relative rotation;

said integral spacer and roller component retainer element also having surface means thereon for closing said pockets for preventing escape of the rollers from said pockets; and said integral spacer and roller component retainer element having a radial outer bearing surface and a radial inner bearing surface, one of said races having an annular surface thereon engageable with said radial inner bearing surface of the integral spacer and roller component retainer element and the other of the races having an annular surface engageable with said radial outer bearing surface and an annular groove located radially outwardly of said last mentioned annular surface; and said integral spacer and roller component retainer element having a plurality of circumferentially spaced retention tabs therein which fit within said annular groove.

* * * * *